March 26, 1940. J. Z. DENINSON 2,194,972
SYSTEM OF SCANNING OR PROJECTING PICTURES
Filed May 19, 1937
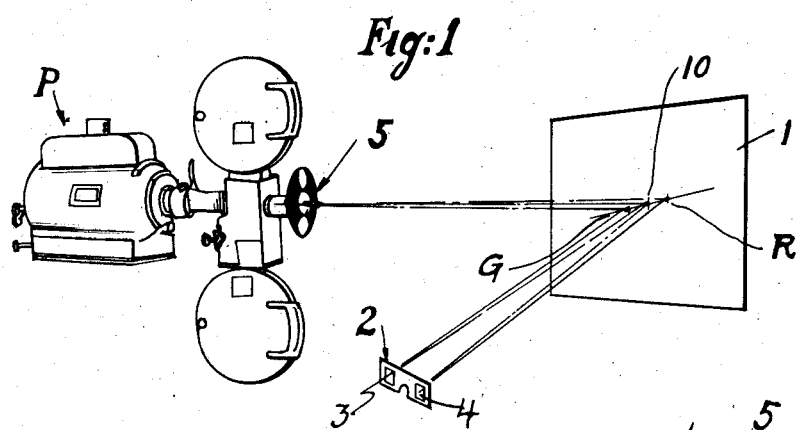
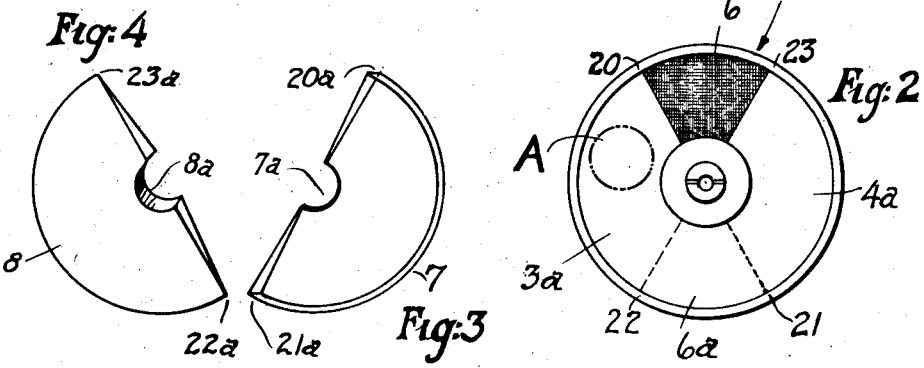
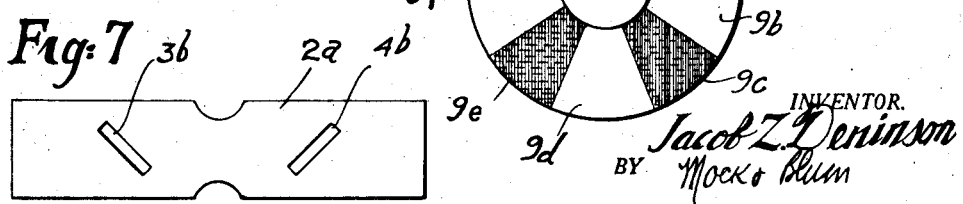
INVENTOR.
Jacob Z. Deninson
BY Mock & Blum
ATTORNEYS.

Patented Mar. 26, 1940

2,194,972

UNITED STATES PATENT OFFICE 2,194,972

SYSTEM OF SCANNING OR PROJECTING PICTURES

Jacob Z. Deninson, New York, N. Y.

Application May 19, 1937, Serial No. 143,487

1 Claim. (Cl. 88—16.6)

My invention relates to a new and improved system of scanning or projecting pictures.

One of the objects of my invention is to provide a system and means of scanning or projecting pictures whereby a stereoscopic effect is secured with the use of an ordinary motion picture film, which may be in monocolor, such as the ordinary black and white motion picture film.

Another object of my invention is to provide a system and device whereby the picture or frame will be projected and scanned with the use of different or complementary colors in rapid succession, and while shifting one of the projected pictures relative to the other projected picture or pictures.

I prefer to use complementary lights in the improved system. Such complementary lights may be of complementary colors such as red and green, or they may consist of light polarized in different planes.

Another object of the invention is to provide extremely simple and efficient means for this purpose which will make it unnecessary to print a plurality of pictures in complementary colors upon each frame of the motion picture film.

Another object of the invention is to provide a system and means whereby the person who observes the projected picture will observe the picture in its true monocolor (such as black and white), in addition to viewing the picture by means of complementary lights.

Other objects of my invention will be set forth in the following description and drawing which illustrates a preferred embodiment thereof, it being understood that the above statement of the objects of my invention is intended generally to explain the same without limiting it in any manner.

Fig. 1 is a diagrammatic perspective view showing the improved system.

Fig. 2 is an elevation of an improved shutter which is used in connection with the motion picture projector.

Figs. 3 and 4 illustrate the method of forming the prisms or other image-displacing optical means.

Fig. 5 shows a modified form of shutter.

Fig. 6 indicates one type of screen or filter which may be used in the improved system.

Fig. 7 shows improved glasses.

Referring to Fig. 1, this diagrammatically shows a motion picture projector P which may be of any conventional type and which projects the frames of a motion picture film upon a screen 1.

A shutter 5 is mounted turnably in front of the objective lens of the projector.

It would not be departing from the invention if said shutter 5 were mounted elsewhere as for example, between the gate of the projector and the objective lens of the projector, or between the gate of the projector and the condensing lens of the projector, or generally speaking, at any point between the source of light and the screen.

Referring to Fig. 2, the shutter has an opaque segment 6, a transparent and colorless segment 6a, and segments 3a and 4a which are made of transparent material, having different or complementary colors. For example, the segment 3a may have a green color and the segment 4a may have a red color. These colors need not be complementary colors. The circle which is indicated by the reference letter A, diagrammatically indicates the position of the objective lens.

While I do not wish to be limited to the proportions stated by way of illustration, the segments 6 and 6a are preferably equal and each segment corresponds to an angle of substantially 60°, and the segments 3a and 4a are equal and they correspond respectively to angles of substantially 120°.

The segment 6a may be opaque, instead of being transparent. It is preferably non-prismatic, and it has planar and parallel front and rear faces.

The shutter 5 is mounted so that it may turn one and one-half revolutions during the exposure of each frame. This relationship may be varied and if desired, the shutter 5 may be turned a single revolution during each exposure of the frame.

The shutter 5 is turned automatically by the mechanism which operates the other moving parts of the projector, in any suitable manner (not shown). The shutter 5 may be on the same shaft as the conventional shutter of the projector.

The shutter 5 is turned continuously. One or both of the complementary zones or segments 3a or 4a are provided with optical means for displacing the projected image on the screen, in a direction lateral to the normal line of projection of the projector P. For example, the segment 3a may be made of glass of prismatic shape and the segment 4a may be made of planar red glass having parallel front and rear surfaces, or segment 4a may also be prismatic.

Assuming that the transparent and colorless and non-prismatic segment 6a is aligned with the objective lens, the center of the picture will be projected upon the screen 1, at the point 10. If each of the segments 4a and 3a is prismatic, the projection of the frame through the segment 3a will be at the point G and the projection of the frame through the red segment 4a will be at the point R. The observer wears the glasses 2 having a transparent green insert 3 and a transparent red insert 4. The observer therefore alternately sees the images which are projected through the segments 3a and 4a in such rapid succession as to get the effect of persistence of vision.

The displacement of the images due to the prisms is small as said prisms may have an angle of as low as fifteen minutes up to one degree.

While I do not wish to be limited to the angles of the prisms, I do not wish to have an excessive lateral shifting of the images.

Due to the fact that the projected images are alternately viewed through different eyes of the observer, and due to the rapid lateral shifting of the successive images and the effect of persistence of vision, a marked stereoscopic effect is secured.

When the image is projected through the colorless and transparent and non-prismatic section 6a, the center of the image is observed at the point 10 and in what may be designated as the normal position and with both eyes.

Fig. 4 shows one of the prismatic elements 8 which may be used. Said element consists in effect of a section of a cone taken through its axis, and having a recess 8a, at the apex of its triangular face.

In order to understand the construction of prismatic element 7 shown in Fig. 3, it may be assumed that a glass parallopipedon or disc has a conical depression formed in one planar face thereof, with the axis of said depression perpendicular to said face, and said depression is identical in contour with the cone which is the geometrical basis for element 7. The parallopipedon or disc is then cut through a plane which passes through the axis of said conical depression, and recess 7a is then formed in the thin face of the resulting member. Elements 8 and 7 thus have the same optical displacing effect, but in radial directions opposite from the centre of the shutter 5.

The prismatic element 7 may be green and transparent, and it may be located at one side of shutter 5, with point 23a at 23, and point 22a at 22. The prismatic element 8 may be located at the other side of the shutter with the point 20a coinciding with the point 20 and with the point 21a coinciding with the point 21.

The prismatic element 8 may be transparent and of a red color.

Therefore these prisms will have overlapping portions in the zone designated as 6a in Fig. 2. Since these overlapping portions have complementary colors, the effect is the same as though the zone 6a were opaque.

The elements 7 and 8 can be adjustably mounted on the shutter 5, so as to increase or decrease the areas of their overlapping portions and thereby provide an opaque zone of varying angle, if they have complementary colors.

The green and red colors can be secured by means of layers of colored gelatin which may be applied to the faces of transparent and colorless prismatic elements.

Fig. 5 shows a modified shutter 9 having an opaque section 9a, a transparent and colorless nonprismatic section 9b having opposite parallel and planar faces, an opaque section 9c, a red and transparent section 9d, which is prismatic, an opaque section 9e, and a green and transparent prismatic section 9f. The angles of the prismatic sections 9d and 9f are such as to shift the image laterally and in opposite directions.

In this embodiment the green prismatic zone 9f and the red prismatic zone 9d are shown as having arcs of different length, so as to regulate the period of projection of the image by red light or by green light. The angles of said prismatic elements may be equal and opposite in direction, in radial planes. It is sometimes advantageous to have the projection by one light take a shorter time than the projection by the other light.

Likewise I can vary the arc of the transparent and colorless zone 9b, which is non-prismatic, depending upon the intensity of the light source and the character of the light source.

I do not wish to be limited to the use of complementary colors, because the same effect can be secured by the use of different colors in any combination even though they are not complementary.

Likewise I can use sources of light of different colors if desired, the essential feature being the consecutive viewing of the images projected on the screen, separately by the eyes of the observer, these images being preferably non-coincident.

The light from the source may be caused to pass through filters or screens in order to improve the stereoscopic effect. I can use a filter for removing any desired wave band from the white light. Likewise I have found that improved stereoscopic projection is secured by passing the light from the source through the usual half-tone screen which has opaque lines in two parallel rows, said rows being perpendicular to each other, so that the light passes in effect through a series of tiny transparent windows of rectangular shape between these lines.

Likewise I can use a filter of the type shown in Fig. 6, which indicates the opaque lines which have been formed upon a transparent sheet of material.

In using the improved type of screen illustrated in Fig. 6, the effective light which passed through said filter consisted in effect of narrow bands arranged in a zigzag pattern, said bands of light being parallel to each other. The narrow zigzag bands of light were then caused to pass through the lenses and through the shutter or shutters of the apparatus.

The image on the screen, when seen through glasses 2 or 2a, and through the colorless transparent zone of the shutter is in true black and white, if this is the color of the film, and the inserts of the glasses have complementary colors. It will be noted that the film is fed intermittently through the projector, in the usual manner, so that the frames are projected through the optical displacing means, while the frames are stationary.

In forming the prismatic element 8, the recess 8a is at the central part of the triangular face of the half-cone, and the axis of said recess is parallel to the axis of the original cone, and said recess is symmetrical relative to the axis of the original cone.

When the elements 8 and 7 are used, points of the frame which are exposed in the gate are displaced in one direction away from the centre of shutter 5 by one element, and said points will be equally displaced in the opposite direction by the other element. Each radial section through element 8 will be a triangle having its apex at the periphery of shutter 5 and having its base at the centre of shutter 5.

In element 7, each radial section will be a triangle whose base is at the periphery of shutter 5, and whose apex is at the centre of shutter 5.

The recesses 8a and 7a are formed merely for mechanical convenience.

I can form sections 8 and 7 from ordinary prisms having planar faces inclined to each other, by cutting from said prisms, blanks having peripheries of semi-circular contour. Each said cut-out blank will have a rectangular face, and a circular face and an elliptical face. Said circular face and said elliptical faces will be planar, their planes will be inclined to each other, and the thin edge of said blank will be a semi-circle.

The improved eyeglasses 2a shown in Fig. 7 have narrow transparent inserts 3b and 4b which may be respectively green and red, or any other color combination. The slits make an angle of 90° with each other and they are quite narrow, about $\frac{3}{32}$ of an inch in width. Their length is about one inch.

The said angle and dimensions are given only as a practical working example, and said angle and dimensions may be varied.

The transparent members 3 and 4 of Fig. 1 are about the same size as the average eyeball. By using narrower transparent members 3b and 4b an improved effect is secured.

Glasses with slits of the kind shown in Fig. 7, and without colored transparencies in said slits, can be used for viewing ordinary motion pictures, projected without the use of the improved shutters disclosed herein.

The bodies of glasses 2 and 2a can be made of cardboard or other opaque material.

For the purposes of definition, different lights may be lights of different colors, or polarized in different planes, or varying in any manner. One of said lights may be ordinary white light (non-polarized or polarized) and the other light will have a non-white color, or it may be polarized in a plane different from the first light.

If I use lights of different colors (for example) said lights can be designated as a first light and a second light. If ordinary white light (unpolarized) is used in the projection, as for example, when segment 9b is in operative position, said light may be designated as composite light, because the image is then seen by both eyes of the observer. A light having a single color, or polarized in a definite plane, so that it can be seen only by one eye of the observer, may be designated as a selective light.

The opaque section or sections of a shutter may be in operative position so as to cut off the light, when the film is given its intermittent feeding movement, so as to move a different frame of the film into the gate.

Since the eye-openings of the glasses 2a are inclined to each other, the observer can adjust said glasses until the pupils of both eyes register with said openings, since the interpupillary distance varies with different people.

I claim:

A method of projecting the successive frames of a motion picture film on a screen, which consists in projecting images of each frame on a screen while the frame is held stationary, successively by means of different selective lights and also by composite light, projecting the image by the composite light upon a predetermined area on the screen, projecting the images by selective lights upon different areas of said screen which overlap and which are offset relative to said predetermined area, in opposite directions, viewing each of the images projected by the selective lights only with different eyes of the observer, viewing the image projected by the composite light with both eyes of the observer, said images of each frame being projected with sufficient rapidity to secure the effect of persistence of vision.

JACOB Z. DENINSON.